United States Patent [19]
Mori

[11] Patent Number: 4,600,317
[45] Date of Patent: Jul. 15, 1986

[54] PAD TYPE JOURNAL BEARING DEVICE WITH A CONSTANT BEARING CLEARANCE

[75] Inventor: Sanae Mori, Nagoya, Japan

[73] Assignee: Daido Metal Company Ltd., Nagoya, Japan

[21] Appl. No.: 708,537

[22] Filed: Mar. 5, 1985

[30] Foreign Application Priority Data

Mar. 16, 1984 [JP] Japan ................................ 59-50830

[51] Int. Cl.$^4$ .................... F16C 17/03; F16C 27/02
[52] U.S. Cl. .................................. 384/117; 384/119; 384/215; 384/312
[58] Field of Search ............ 384/114, 117, 119, 122, 384/124, 303, 306, 308, 309, 312, 215, 218, 219, 220, 223, 224, 225

[56] References Cited

U.S. PATENT DOCUMENTS

| | | | |
|---|---|---|---|
| 3,318,643 | 5/1967 | Pilarczyk et al. | 384/312 |
| 3,756,673 | 9/1973 | Strub | 384/117 |
| 4,012,085 | 3/1977 | Kunderman | 384/220 |
| 4,515,486 | 5/1985 | Ide | 384/117 |

Primary Examiner—Stuart S. Levy
Assistant Examiner—David Werner
Attorney, Agent, or Firm—Sheridan Neimark

[57] ABSTRACT

A pad type journal bearing device includes a plurality of bearing pads disposed in circumferentially spaced relationship to one another within a casing and swingable about axes parallel to an axis of a rotating shaft. In addition, a resilient return member is provided within the casing for biasing the bearing pads in a manner to maintain a constant clearance between the rotating shaft and the bearing pads.

10 Claims, 4 Drawing Figures

PAD TYPE JOURNAL BEARING DEVICE WITH A CONSTANT BEARING CLEARANCE

BACKGROUND OF THE INVENTION

This invention relates to a pad type journal bearing device used for a main guide bearing of high precision in a high speed rotary machinery such as turbines and compressors or machine tools, and more particularly, to a pad type journal bearing device with a constant bearing clearance.

In prior pad type journal bearing devices, bearing pads are constructed so as to be capable of slightly tilting in a circumferential direction with the aid of positioning pins disposed between adjacent bearing pads, or constructed such that when the device is not mounted on a rotating shaft to be loose, they can shift radially inwardly away from a casing to the extent the device does not become completely disassembled. When a rotating shaft is inserted into a bearing device of such a structure in order that the bearing device may be used as a tilting pad type journal bearing, a bearing clearance between the rotating shaft and the bearing pads is apt to be inconstant and nonuniform. Consequently, breakage of a lubricating oil film produced due to poor lubricating action degrades the follow-up capability at the time of start-up and suspension, and, in particular, causes vibrations and noises at the time of start-up.

SUMMARY OF THE INVENTION

Accordingly, it is an object of the invention to eliminate the above-described drawbacks of the pad type journal bearing device of the prior art.

It is another object of the invention to provide a pad type journal bearing device which is designed to keep a constant bearing clearance throughout start-up, operation and suspension, which does not cause vibration noises at the start-up and which is very effective in vibration damping.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
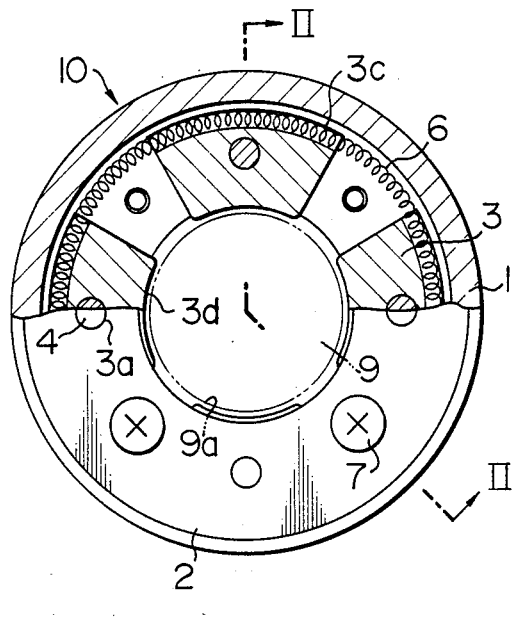
FIG. 1 is a fragmentary cross sectional view of a pad type journal bearing device according to a first embodiment of the invention.
Figure 2:
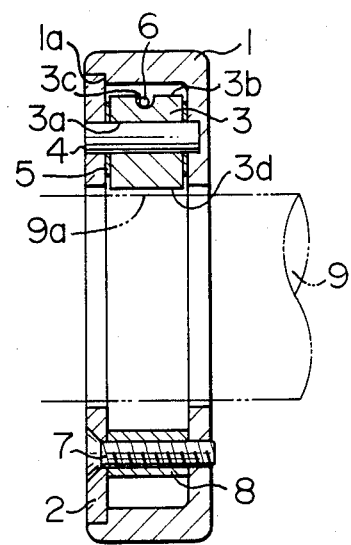
FIG. 2 is a sectional view of the first embodiment taken along the line II—II of FIG. 1.

FIGS. 1 and 2 show a pad type journal bearing device 10 according to a first embodiment of the invention. This device includes a casing 1 which has a C-shape in the axial cross section, a side plate 2 which is fitted in the stepped portion 1a of the casing 1 and is fixed by flat head screws 7, a plurality of bearing pads 3 each having a sector-shaped cross section in a direction perpendicular to the axial direction, a plurality of pins 4 extending through the holes 3a of the bearing pads 3 and secured to the casing 1 and the side plate 2, two ring-shaped wave washers 5 disposed between the casing 1 and the bearing pads and between the bearing pads and the side plate 2 respectively, and a resilient return member 6 in the form of a tension spring and wound in a groove 3c formed on the outer peripheral surface 3b of each bearing pad 3. The plurality of pins 4 are arranged equidistantly from and equiangularly about the axis of a rotating shaft 9 on which the bearing device 10 is mounted. The flat head screws 7 secure the side plate 2 to the casing 1 with spacers clamped therebetween. Alternatively, the side plate 2 may be secured to the casing 1 by spot welding, continuous welding or screwing, or the side plate 2 and the casing 1 may be formed integral with each other. The casing 1 and the spacer 8 are both made of JIS structural carbon steel, the wave washer 5 and the resilient return member 6 made of stainless steel, and the side plate 2 and the bearing pads 3 made of bearing alloys such as leaded bronze or aluminum alloys. The side plate 2 may be made of JIS structural carbon steel like the casing 1. If the casing 1 is formed of a bearing alloy with high strength and good lubrication effect, the bearing device can be used as a tilting pad type double-direction thrust bearing.

In operation, lubricating oil is fed to a bearing clearance between the inner peripheral surface 3d of the bearing pads 3 and the rotating shaft 9, a lubricating film is formed upon the rotation of the rotating shaft 9 to produce hydrodynamic oil film pressure. Accordingly, each bearing pads 3 overcomes radially inwardly directed components of the tension force of the resilient return member 6 to tilt around the pins 4, thereby generating the lubricating film caused by the wedging effect, and the load on the rotating shaft 9 is then born by the pressure of the lubricating film. It is possible to avoid breakage of the lubricating film by suitably selecting an arrangement and dimensions of the bearing pad 3 relative to those of the rotating shaft 9 and by suitably selecting an elastic force of the resilient return member 6.

Figure 3:
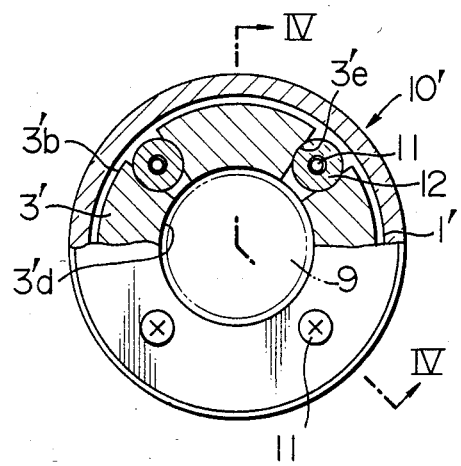
FIG. 3 is a fragmentary cross sectional view of a pad type journal bearing device according to a second embodiment of the invention.
Figure 4:
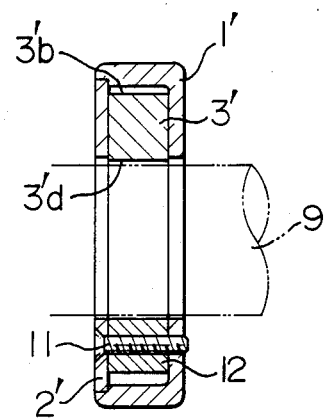
FIG. 4 is a sectional view of the second embodiment taken along the line IV—IV of FIG. 3.

FIGS. 3 and 4 show a pad type journal bearing device 10' according to a second embodiment of the invention. In this embodiment, a resilient return member 12 is in the form of a rubber cylinder, or O-ring and is secured to a casing 1' and a side plate 2' by means of flat head screws 11. Each of bearing pads 3' has a sector-shaped cross section in a direction perpendicular to the axial direction, and is formed on both ends thereof with arcuate recesses 3'e for receiving the resilient return member 12. The second embodiment 10' of a pad type journal bearing device has effects similar to those of the first embodiment 10'.

As described above, a pad type journal bearing device according to the invention has the following advantages:

(1) A constant bearing clearance is maintained throughout start-up, normal operation and suspension of the device.
(2) No vibration noises are generated at the time of start-up.
(3) Vibration damping effect is attained during high-speed operation.
(4) A thrust load as well as a radial load can be born.

It is to be understood that the invention is not limited by the embodiments shown and described, but is defined by the appended claims.

What is claimed is:

1. A pad type journal bearing device including a plurality of bearing pads disposed in circumferentially spaced relationship to each other in a casing and swingable about axes parallel to the axis of a rotating shaft, the improvement comprising a resilient return member disposed in said casing for biasing said bearing pads in a manner to maintain a constant clearance between said rotating shaft and said bearing pads, wherein said each bearing pad is formed between its partially cylindrical, inner peripheral surface and its partially cylindrical, outer peripheral surface with an aperture extending axially of said rotating shaft and at its outer peripheral surface with a circumferentially extending groove, and said resilient return member is mounted under tension of the grooves of said respective bearing pads to maintain a constant bearing clearance, and further comprising pins each loosely fitted in said each aperture and secured to said casing for allowing said each bearings pad to swing about an axis parallel to the axis of said rotating shaft.

2. A pad type journal bearing device as set forth in claim 1, wherein said casing is constructed by two parts.

3. A pad type journal bearing device as set forth in claim 1, wherein said casing is constituted by one piece.

4. A pad type journal bearing device as set forth in claim 1, wherein said resilient return member is an annular-shaped, tension coiled spring.

5. A pad type journal bearing device as set forth in claim 1, wherein said resilient return member is an O-ring.

6. A pad type journal bearing device as set forth in claim 2, wherein said resilient return member is an annular-shaped, tension coiled spring.

7. A pad type journal bearing device as set forth in claim 3, wherein said resilient return member is an annular-shaped, tension coiled spring.

8. A pad type journal bearing device as set forth in claim 2, wherein said resilient return member is an O-ring.

9. A pad type journal bearing device as set forth in claim 3, wherein said resilient return member is an O-ring.

10. A pad type journal bearing device including a plurality of bearing pads disposed in circumferentially spaced relationship to each other in a casing and swingable about axes parallel to the axis of a rotating shaft, the improvement comprising a resilient return member disposed in said casing for biasing said bearing pads in a manner to maintain a constant clearance between said rotating shaft and said bearing pads, wherein said resilient return member consists of blocks, each of which is mounted on said casing by means of a mount to bias the circumferentially terminal ends of adjacent bearing pads, and wherein said resilient return member is formed of a resilient material such as rubber and plastics.

* * * * *